US009170912B1

(12) United States Patent
Hu et al.

(10) Patent No.: US 9,170,912 B1
(45) Date of Patent: Oct. 27, 2015

(54) SYSTEM AND METHODS FOR POWER AND ENERGY MODELING IN COMPUTING DEVICES USING SYSTEM CALL TRACING

(71) Applicant: PURDUE RESEARCH FOUNDATION, West Lafayette, IN (US)

(72) Inventors: Yu Charlie Hu, West Lafayette, IN (US); Abhinav Pathak, San Jose, CA (US)

(73) Assignee: Purdue Research Foundation, West Lafayette, IN (US)

( * ) Notice: Subject to any disclaimer, the term of this patent is extended or adjusted under 35 U.S.C. 154(b) by 191 days.

(21) Appl. No.: 13/859,499

(22) Filed: Apr. 9, 2013

Related U.S. Application Data

(60) Provisional application No. 61/621,670, filed on Apr. 9, 2012.

(51) Int. Cl.
*G06F 11/30* (2006.01)
*G06F 1/32* (2006.01)

(52) U.S. Cl.
CPC .......... *G06F 11/3062* (2013.01); *G06F 1/3203* (2013.01); *G06F 1/3206* (2013.01)

(58) Field of Classification Search
CPC .. G06F 11/3062; G06F 1/3206; G06F 1/3203
See application file for complete search history.

(56) References Cited

U.S. PATENT DOCUMENTS

| | | | | |
|---|---|---|---|---|
| 8,880,925 | B2* | 11/2014 | Chang et al. | 713/340 |
| 2011/0282603 | A1* | 11/2011 | Milenkovic et al. | 702/62 |
| 2012/0011378 | A1* | 1/2012 | Dalton et al. | 713/300 |
| 2013/0211752 | A1* | 8/2013 | Shi et al. | 702/61 |

OTHER PUBLICATIONS

Android phones steal market share. URL http://bmighty.informationweek.com/mobile/showArticle.jhtml?articleID=224201881., 2 pages, Date Unknown.
Celog event tracking. URL http://msdn.microsoft.com/en-us/librarylaa462467.aspx., 1 page, Date Unknown.
Cyanogenmod: Android community rom based on froyo.URL http://www.cyanogenmod.com/., 1 page, Date Unknown.
Event tracing for windows (etw). URL http://msdn.microsoft.com/en-us/library/ms751538.aspx., 3 pages, Date Unknown.
Microsoft platform builder. URL http://msdn.microsoft.com/en-us/library/ms938344.aspx., 1 page, Date Unknown.
(Continued)

*Primary Examiner* — Stefan Stoynov
(74) *Attorney, Agent, or Firm* — Maginot, Moore & Beck LLP

(57) ABSTRACT

A method for generating a power consumption and energy usage model for a computing device includes monitoring of the power consumption of the computing device with an external power monitor when the computing device is in a base power state, monitoring of the power consumption of the computing device during execution of a system call with a processor that interacts with a component in the computing device, and monitoring the power state of the computing device before the computing device returns to the base power state. The method further includes generating a finite state machine model of the power states and transitions between power states to model the power activities and energy consumption of the computing device in the absence of an external power monitor.

21 Claims, 9 Drawing Sheets

(56) References Cited

OTHER PUBLICATIONS

Monsoon power monitor. URL http://www.msoon.com/LabEquipment/PowerMonitor/., 1 page, Date Unknown.
Strace. URL http://linux.die.net/man/1/strace. 8 pages, Date Unknown.
System tap. URL http://sourceware.org/systemtap/., 2 pages, Date Unknown.
Windows embedded ce shared source. URL http://msdn.microsoft.com/en-us/windowsembedded/ce/dd567722.aspx., 2, pages, Date Unknown.
Balasubramanian, Niranjan, Aruna Balasubramanian, and Arun Venkataramani. Energy Consumption in Mobile Phones: A Measurement Study and Implications for Network Applications. In Proc of IMC, 2009.
Barham, Paul, Austin Donnelly, Rebecca Isaacs, and Richard Mortier. Using magpie for request extraction and workload modelling. In Proc. of OSDI, 2004.
Bellosa, F. The benefits of event: driven energy accounting in power-sensitive systems. In Proc. ACM SIGOPS European workshop, 2000.
Bircher, W.L. And L.K. John. Complete system power estimation: A trickle-down approach based on performance events. In Proc. of ISPASS, 2007.
Bose, Abhijit, Xin Hu, Kang G. Shin, and Taejoon Park. Behavioral detection of malware on mobile handsets. In Proc. of MobiSys, 2008.
Chipounov, Vitaly and George Candea. Reverse Engineering of Binary Device Drivers with RevNIC. In Proc. of EuroSys, 2010.
Fan, X., W.D. Weber, and L.A. Barroso. Power provisioning for a warehouse-sized computer. In Proc. of ISCA, 2007.
Flinn, Jason and M. Satyanarayanan. Energy-aware adaptation for mobile applications. In Proc. of SOSP, 1999.
Flinn, Jason and M. Satyanarayanan. Powerscope: A tool for profiling the energy usage of mobile applications. In Proc. of WMCSA, 1999.
Graham, S. L., P. B. Kessler, and M. K. McKusick. gprof: A call graph execution profiler. In Proc. of ACM PLDI, 1982.
Guo, Zhenyu, Xi Wang, Jian Tang, Xuezheng Liu, Zhilei Xu, Ming Wu, M. Frans Kaashoek, and Zheng Zhang. R2: An application-level kernel for record and replay. In OSDI, pp. 193-208, 2008.
Kansal, A., F. Zhao, J. Liu, N. Kothari, and A.A. Bhattacharya. Virtual machine power metering and provisioning. In Proc. of SOCC, 2010.
Mahesri, A. and V. Vardhan. Power consumption breakdown on a modern laptop. Proc. of PACS, 2005.
Rawson, F. Mempower: A simple memory power analysis tool set. IBM Austin Research Laboratory, 2004.
Shnayder, Victor, Mark Hempstead, Bor rong Chen, Geoff Werner Allen, and Matt Welsh. Simulating the power consumption of large-scale sensor network applications. In Proc. of Sensys, 2004.
Shye, A., B. Scholbrock, and G. Memik. Into the wild: studying real user activity patterns to guide power optimizations for mobile architectures. In Proc. of MICRO, 2009.
Snowdon, David C., Etienne Le Sueur, Stefan M. Petters, and Gernot Heiser. Koala: a platform for os-level power management in Proc. of EuroSys, 2009.
Stanley-Marbell, P. And M. Hsiao. Fast, flexible, cycle-accurate energy estimation. In Proc. of ISLPED, 2001.
Tiwari, V., S. Malik, A. Wolfe, and M. Tien-Chien Lee. Instruction level power analysis and optimization of software. The Journal of VLSI Signal Processing, 13(2), 1996.
Yuan, C., N. Lao, J. Wen, J. Li, Z. Zhang, Y. Wang, and W. Ma. Automated known problem diagnosis with event traces. In EuroSys, 2006.
Zedlewski, J., S. Sobti, N. Garg, F. Zheng, A. Krishnamurthy, and R.Wang. Modeling hard-disk power consumption. In Proc. of FAST. USENIX Association, 2003.
Zeng, Heng, Carla S. Ellis, Alvin R. Lebeck, and Amin Vandat. Ecosystem: Managing energy as a first class operating system resource. In Proc. of ASPLOS, 2002.
Zhang, L., B. Tiwana, Z. Qian, Z. Wang, R.P. Dick, Z.M. Mao, and L. Yang. Accurate Online Power Estimation and Automatic Battery Behavior Based Power Model Generation for Smartphones. In Proc. of CODES+ISSS, 2010.

\* cited by examiner

SYSTEM AND METHODS FOR POWER AND ENERGY MODELING IN COMPUTING DEVICES USING SYSTEM CALL TRACING

CLAIM OF PRIORITY

This patent claims priority to U.S. Provisional Application No. 61/621,670, which is entitled "Fine-Grained Power Modeling for Smartphones Using System Call Tracing," and was filed on Apr. 9, 2012, the contents of which are hereby incorporated in their entirety by reference.

CROSS-REFERENCE

This application cross-references a copending U.S. patent application Ser. No. 13/859,690, which is entitled "SYSTEM AND METHOD FOR ENERGY USAGE ACCOUNTING IN SOFTWARE APPLICATIONS," and was filed on Apr. 9, 2013, the contents of which are hereby incorporated in their entirety by reference.

TECHNICAL FIELD

This document relates generally to systems and methods for monitoring electrical power usage and energy consumption in electronic devices, and, more particularly, to systems and methods for estimating electrical power and energy consumption in computing devices that execute software programs.

BACKGROUND

In recent years, advances in digital computing hardware and software have resulted in a proliferation of mobile computing devices that come in a wide range of form factors including devices that are worn on the body of the user and handheld devices such as smartphones and tablets. Modern mobile computing devices incorporate numerous components including, but not limited to, single and multi-core central processing units (CPUs), graphical processing units (GPUs), random access memory (RAM), digital data storage components such as solid-state drives (SSDs), radio transceivers that provide access to local area networks (LAN) and wide area networks (WAN), global positioning system (GPS) receivers, digital cameras, touch-input display screens, gyroscope and accelerometer sensors, and audio output components. Mobile computing devices typically receive electrical power to operate the components from an integrated battery with a comparatively limited energy storage capacity. Thus, efficient operation of the components in the mobile computing device is important to extending the effective useful life of the device before the battery needs to be recharged or replaced.

In traditional computing applications, the CPU and more recently the GPU have been the predominant consumers of electrical power in the computing system. Existing techniques enable monitoring of the power for the CPU and GPU during operation of the computing system. In some embodiments, the CPU and GPU include integrated hardware power monitoring components that enable fine-grained reporting of the power consumption of the CPU and GPU based on the frequency and utilization rate of the components in the CPU and GPU. For example, a modern CPU typically includes multiple execution cores, cache, and peripheral components that are formed in a single integrated circuit. One or more of the cores in the CPU are utilized when executing program instructions, but a typical CPU also spends a large fraction of the time in an idle state where the entire CPU or various components in the CPU do not execute programmed instructions. Modern CPUs include dynamic clock speed adjustments, power gating, and other power control techniques that reduce the power consumption of the CPU when one or more components in the CPU are idle or utilized at less than full capacity. For example, in one operating mode a CPU with four execution cores executes a series of program instructions with a single CPU core while the remaining cores are idle. The CPU reduces the clock speed of the idle cores, and optionally deactivates the idle cores completely, while the active core consumes more power during execution of the program instructions. Power monitoring hardware in the CPU enables identification of the power consumption of components in the CPU with high precision based on the utilization of the different components in the CPU. Modern GPUs similarly include different power states based on utilization and include similar power monitoring capabilities. CPUs and GPUs in mobile devices are typically integrated in a single system on a chip (SoC) configuration and can be considered as a single device with different sub-components for power consumption monitoring in some embodiments. Existing software applications can retrieve information about the power consumption of the CPU and GPU and identify the power consumption of individual software programs with reference to the utilization rates of the CPU/GPU and the programs that utilize the CPU/GPU during operation.

While monitoring the power consumption in the CPU and GPU is useful in determining a portion of the energy consumption in a computing device, the CPU and GPU are only responsible for a fraction of the power consumption in a modern computing device. In all computing devices, and mobile devices particularly, the additional components in the computing device often consume a significant portion of the total system power in different operating modes. Some existing mobile devices include coarse-grained power consumption monitoring capabilities that enable identification of the aggregate power consumption for the entire mobile device, and some existing power monitoring solutions further monitor the aggregate power consumption of individual components within the mobile device. The existing power monitoring solutions, however, do not enable identification of particular operations within individual software programs that lead to power consumption in the computing device or interactions between operations of multiple software programs in conjunction with different components in the mobile computing device. Consequently, methods for characterizing and estimating the power consumption of different software programs with improved precision in a wide range of computing devices, including mobile computing devices, would be beneficial.

SUMMARY

In one embodiment, a method for generating a power consumption and energy usage model in a computing device has been developed. The method includes monitoring power consumption of a computing device in a first power state with an external electrical power monitor connected to the computing device, executing program instructions stored in a memory corresponding to a first system call with a processor in the computing device, the processor operating a component in the computing device in response to execution of the first system call, monitoring the power consumption in a second power state in response to executing the first system call to identify a level of power consumption and a duration of the second power state, the level of power consumption in the second power state being different than a level of power consumption in the first power state, monitoring the power consumption in a third power state after a transition from the second power state to identify a level of power consumption and a duration of the third power state, the level of power consumption in the third power state being different than the level of power consumption in each of the first power state and the second power state, generating a finite state machine (FSM) model including the first power state, the second power state, and the third power state, the FSM model including a transition from the first power state to the second power state being made with reference to the execution of the first system call, a transition from the second power state to the third power state being made in response to expiration of the duration of the second power state, and a transition from the third power state to the first power state being made in response to expiration of the duration of the third power state, and storing the FSM model in the memory for estimation of energy usage of the computing device in response to execution of the first system call by the processor in conjunction with the at least one other component when the computing device is disconnected from the external power monitor.

In another embodiment, a method for generating a power consumption and energy usage model in a computing device during execution of concurrent system calls has been developed. The method includes monitoring power consumption of a computing device in a first power state with an external electrical power monitor connected to the computing device, executing program instructions stored in a memory corresponding to a first system call with a processor in the computing device, the processor operating a first component in the computing device in response to execution of the first system call, executing program instructions stored in the memory corresponding to a second system call with the processor in the computing device concurrently to the execution of the first system call, the processor operating a second component in the computing device in response to execution of the second system call, monitoring the power consumption in a second power state in response to executing the first system call and the second system call concurrently to identify a level of power consumption and a duration of the second power state, the level of power consumption in the second power state being different than a level of power consumption in the first power state, monitoring the power consumption in a third power state in response to a transition from the second power state occurring after the second power state to identify a level of power consumption and duration of the third power state, the level of power consumption in the third power state being different than the level of power consumption in each of the first power state and the second power state, generating a finite state machine (FSM) model including the first power state, the second power state, and the third power state, the FSM model including a transition from the first power state to the second power state being made with reference to the concurrent execution of the first system call and the second system call, a transition from the second power state to the third power state being made with reference to expiration of the duration of the second power state, and a transition from the third power state to the first power state being made with reference to expiration of the duration of the third power state, and storing the FSM model in the memory for estimation of energy usage of the computing device in response to concurrent execution of the first system call by the processor in conjunction with the first component and the second component when the computing device is disconnected from the external power monitor.

In another embodiment, a computing device that generates a power consumption and energy usage model has been developed. The computing device includes a memory configured to store program data, a processor operatively connected to the memory, and a component connected to the processor to enable the processor to communicate with the component. The processor is configured to receive data from an external power monitor corresponding to power consumption of the computing device in a first power state, execute program instructions stored in the memory corresponding to a first system call, the processor operating a component in the computing device in response to execution of the first system call, receive data from the external power monitor corresponding to power consumption of the computing device in a second power state in response to execution of the first system call to identify a level of power consumption and a duration of the second power state, the level of power consumption in the second power state being different than a level of power consumption in the first power state, receive data from the external power monitor corresponding to power consumption of the computing device in a third power state after a transition from the second power state to identify a level of power consumption and a duration of the third power state, the level of power consumption in the third power state being different than the level of power consumption in each of the first power state and the second power state, generate a finite state machine (FSM) model including the first power state, the second power state, and the third power state, the FSM model including a transition from the first power state to the second power state being made with reference to the execution of the first system call, a transition from the second power state to the third power state being made in response to expiration of the duration of the second power state, and a transition from the third power state to the first power state being made in response to expiration of the duration of the third power state, and store the FSM model in the memory for estimation of energy usage of the computing device in response to execution of the first system call by the processor in conjunction with the at least one other component when the computing device is disconnected from the external power monitor.

DETAILED DESCRIPTION

Figure 1:
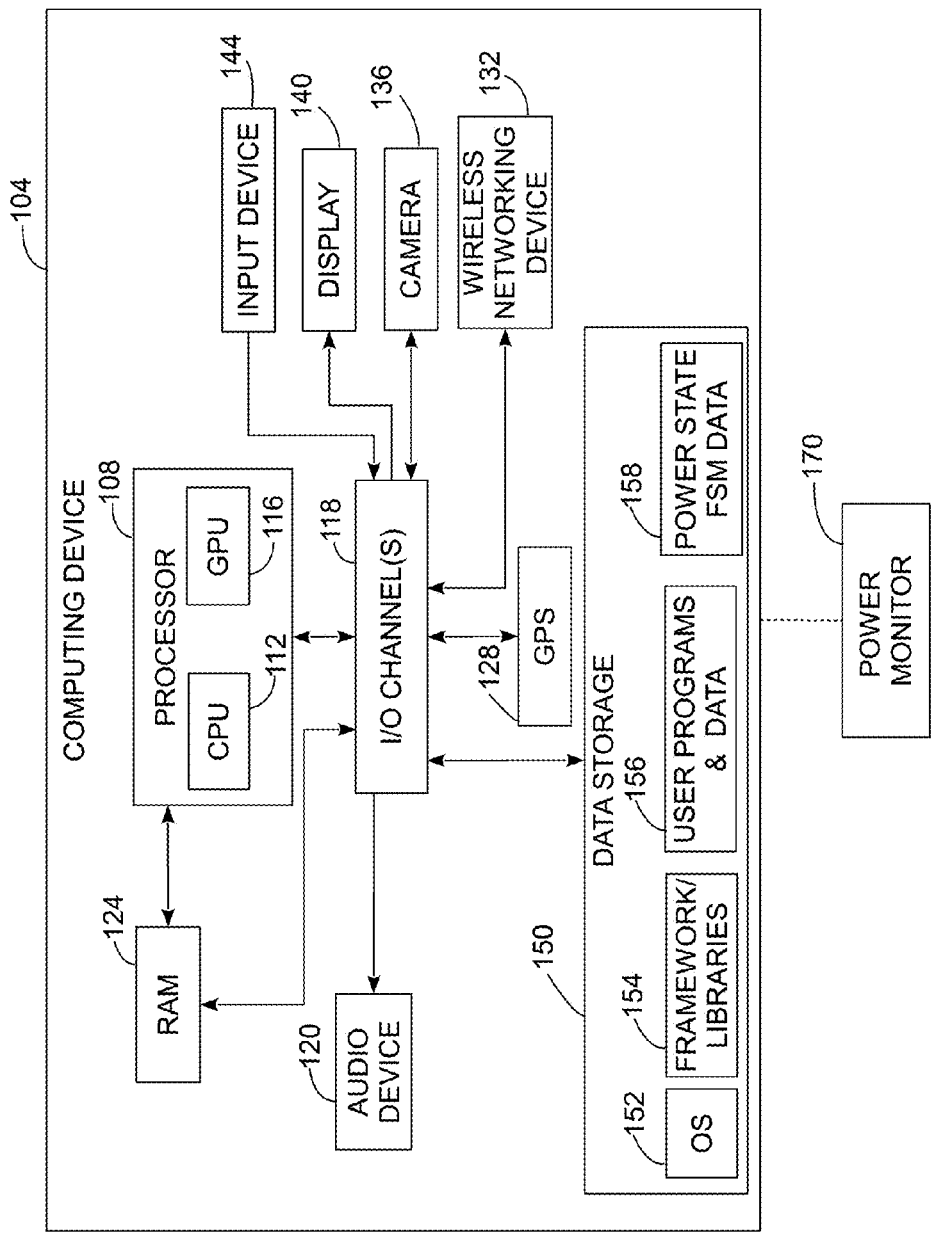
FIG. 1 is a schematic diagram of a mobile computing device that is operatively connected to an external power monitor for generation of a power consumption and energy usage model for components in the mobile computing device.

For the purposes of promoting an understanding of the principles of the embodiments described herein, reference is now be made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

As used herein, the term "system call" refers to any software command in a computing device that enables a program running in the computing device to send or receive data from or otherwise control the operation of one or more hardware components in the computing device. System calls are implemented by operating system (OS) software that controls access to hardware in the computing device through a software interface. For example, the Portable Operating System Interface (POSIX) and Windows Application Programming Interface (API) are two examples of system call interfaces. The term system call refers to a set of software functions that are "called" or invoked by the user level program to access lower-level frameworks and operating system services through a controlled interface. In many instances, user programs do not interact with system calls directly, but instead use higher layer libraries and software frameworks that wrap the functionality of system calls. For example, the Android system incorporates a version of the Linux Kernel and additional software frameworks and libraries in user space. Some user level software programs are executed inside of software virtual machines (VMs) that isolate the software programs and provide an underlying software framework for interacting with hardware components in the computing device. In Android, a native development toolkit (NDK) also enables non-virtualized "native" applications to access selected libraries and the underlying Linux Kernel through, for example, compiled code from the C and C++ programming languages. The "native" applications may be ported from other platforms and in some instances include higher performance than virtualized applications. In versions of the Windows Phone operating system, some user level applications are executed in virtual machines, such as the common language runtime (CLR), while other programs execute system calls using software libraries within a single operating system instance that is executed by the hardware of the computing device.

As used herein, the term "power state" refers to an identified level of power consumption of a single component or multiple components in a computing device during a mode of operation. For example, a wireless transceiver in a computing device operates in different power states when the wireless transceiver is idle, receiving data, sending data, or scanning for available wireless networks. In some power states, the power consumption of a component or the entire computing device vary within a range in a single power state, and a linear regression (LR) model or other estimation technique estimates the variations in power consumption in the power state. In some instances, a component operates in a power state at a level of power consumption and for a time duration that corresponds to one or more input parameters to a system call. For example, in the POSIX specification the "write" system call is used to write data to a file. A parameter in the write system call indicates the size of a data buffer that is to be written to the file. The write system call affects the power state of a data storage component, such as a solid-state disk (SSD) or other storage medium, and the size of the data to be written to the storage component affect the length of the writing process and the total energy consumption during the writing process.

As described in more detail below, in some instances, the computing device executes a system call and the processor returns control to the calling program before all of the components in the computing device finish performing actions that consume electrical power. For example, in the write system call, the data storage device buffers written data and the system call returns control to the calling program before the data storage device completes the write operation and returns to a lower power state. In another operation, a wireless network device sends packets of data and continues to consume power in a productive power state after the system call returns while the network data packets are transmitted. After the network component transmits the final data packet, the network component returns to an intermediate power state that is below the productive power state when sending the data packets, but above an idle state when the network device is not in use. As used herein, the term "productive power state" refers to the power state that occurs during activity in a component that is performed in response to receiving the system call. A productive power state may have a longer duration than the apparent processing time of the system call from the time at which the system call is executed until the system call function returns control to the calling program. A power state that occurs when a component in the computing device consumes power after the completion of the productive power states for a system call is referred to as a "tail power state." If the component remains inactive for a sufficient period of time in the tail power state, the component returns to the "base" power state. As used herein, the term "base power state" refers to a power state in which the component consumes a minimal amount of power during operation of the computing device.

As used herein, the term "finite state machine" (FSM) refers to a model of operation for a computing device where the computing device operates in one of a plurality of states, and one or more events that occur during operation of the computing device precipitate transitions between the states. FSMs are used in a wide range of computing applications, and are described herein for use as a power consumption and energy usage model of a computing device during different modes of operation. In the power consumption and energy usage model, each state of the FSM corresponds to a power state for either the entire computing device or selected components in the computing device. The transitions between power states are triggered through invocation of system calls, completion of execution of system calls, and from transitions between tail power states that occur in response to the operation of different components in the computing device after nominal completion of the system call.

As is known in the art, the electrical power consumption of the computing device corresponds to the supply voltage (E)

multiplied by the supply current (I). In many mobile electronic devices, the supply voltage E is held constant during operation of the device, and the level of electrical current varies as the device increases and decreases power consumption during operation. For example, some mobile computing devices receive power from lithium ion batteries that generate a supply voltage of 3.7 volts. In other embodiments, an electrical power supply includes multiple voltage rails that each provides electrical power at one of a plurality of constant voltage levels, such as 12 volts, 5 volts, and 3.3 volts, to different components in a computing device. Thus, the changes to the electrical power consumption in computing devices are sometimes referred to in terms of the electrical supply current. As is further known in the art, the energy consumption of the computing device is the integral of the power consumption over time. Thus, when the computing device operates in an identified power state for an identified time duration, the energy consumption corresponds to the level of power consumption in the power state multiplied by the time duration in the power state.

FIG. 1 depicts an illustrative embodiment of a computing device 104 and an external power meter 170 that is configured to measure the electrical power usage of the computing device 104 before, during, and after execution of system calls during operation. The computing device 140 includes a processor 108 that is operatively connected to multiple components including an audio component 120, random access memory (RAM), global positioning system (GPS) receiver 128, wireless network component 132, camera 136, display device 140, input component 144, and data storage component 150 through one or more input-output (I/O) channels 118. As used herein, the term "component" refers to any circuit, device, or system within a computing device that consumes electrical power during operation and interacts with a processor in the computing device through an I/O channel that provides a unidirectional or bidirectional communication path for sending and receiving digital data with the processor and optionally with RAM. The illustrative embodiment of the computing device 104 includes elements that are common to a wide range of computing devices including, but not limited to, desktop and notebook personal computers, smartphones, tablets, personal digital assistants (PDAs), wearable computing devices, and the like. Alternative computing device embodiments optionally omit some of the elements depicted in FIG. 1, and optionally include components that communicate with a processor through one or more I/O channels beyond the components that are illustrated in FIG. 1.

In the computing device 108, the processor 108 includes one or more central processing unit (CPU) cores 112 and a graphical processing unit (GPU) 116. In the computing device 104, the CPU 112 and GPU 116 are combined into a single integrated circuit in a system on a chip (SoC) configuration. The CPU includes one or more execution cores that implement a general-purpose instruction set including, but not limited to, instruction sets from the x86, ARM, MIPS, and POWER families. The GPU includes computational units including fixed-function and programmable shader processors, geometry and rasterization engines that enable generation of 2D and optionally 3D graphics through the display component 140 using, for example, the OpenGL or Direct 3D application programming interfaces (APIs). The CPU 112 and GPU 116 optionally share hardware resources and in some embodiments, the GPU 116 also performs computational tasks that are unrelated to the generation of graphics using, for example, the OpenCL API. In an alternative embodiment, the CPU and GPU communication through an external I/O channel such as the PCI express (PCIe) data bus standard. As described in more detail below, the processor 108 is responsible for execution of stored program instructions implement in an operating system, software frameworks and system libraries, and user level program instructions. The processor executes system calls that enable user level programs to invoke the operating system to access components in the computing device 104 through one or more of the I/O channels 118.

In the computing device 104, the audio component 120 is typically a digital signal processor (DSP) in association with filters, amplifiers, speakers and other hardware and software components that enable the computing device 104 to generate audio output signals. In one embodiment, the processor 108 executes one or more software programs to decompress and decode audio data into a pulse-code modulated (PCM) format or other suitable format for audible output of music, voice, and other sounds through the audio output component 120.

The random access memory (RAM) 124 stores program data for executing programs as well as data corresponding to user files and temporary system data. RAM is typically a volatile memory module that does not retain information after the removal of electrical power from the computing device 104. The processor 108 uses the RAM 124 for temporary data storage during operation in addition to smaller memory caches that are typically incorporated with the CPU 112 and GPU 116. The RAM 124 is commonly used to store data that are read from the data storage component 150 and held within a memory buffer for use by the OS and software applications. As described below, system calls that nominally interact with the data storage component 150 actually read or write buffered file data stored in the RAM 124 for blocks of data that are temporarily held in the memory buffer.

The global positioning system (GPS) receiver 128 includes a radio receiver and antenna that are typically configured to receive timing signals from multiple orbiting satellites to identify a geographic location of the computing device 104 and optionally identify a rate and direction of travel for the computing device 104. In alternative embodiments, the GPS includes additional radio receivers that receive signals from terrestrial radio transmitters, and some GPS embodiments further include compasses, altimeters, accelerometers, and gyroscopes that provide inertial navigation services in addition to receiving signals from external navigation systems. In some embodiments, the processor 108 requests geographic coordinates, such as latitude and longitude coordinates, from the GPS 128, and the GPS 128 caches the response for a brief time. Thus, the GPS 128 enters a higher power state to identify the location of the computing device 104 when no location coordinate data have been requested for a predetermined period of time, but the GPS 128 sends cached location coordinate data in response to a subsequent request that occurs within a predetermined length of time.

The wireless network component 132 includes one or more radio transceivers that implement wireless local area network (WLAN) and wireless wide area network (WWAN) functionality. Examples of WLAN transceivers include transceivers that implement the Bluetooth and the IEEE 802.11 (Wi-Fi) families of protocols. Examples of WWAN transceivers include transceivers that implement the GSM, CDMA, UMTS, LTE, EDGE, EVDO, WiMAX and other WWAN standards that enable wireless and voice and data communication. In a mobile computing device configuration, the computing device 104 sends and receives wireless data packets via a wireless component 132 that implements the physical layer of the standard network protocol stack that is implemented with the operating system software in the computing device 104. The wireless network component 132 optionally implements telephony using GSM and CDMA protocols that interface with a cellular telephony network. In mobile computing devices, the wireless network components often consume large amounts of electrical power. Many wireless network components transition between multiple power states to reduce power consumption when the wireless transceiver is idle or operating at low data rates, while increasing power consumption to operate at higher data rates.

The camera 136 is typically a digital camera that generates still photographs or video data in response to commands received from the processor 108. In some embodiments, an illumination source such as a flash, light, or infrared illuminator provides artificial illumination for the camera. The camera 136 typically draws minimal power when deactivated, but the camera and associated illumination sources may draw substantial power over short periods for still photographs, or for longer periods when generating videos.

The display component 140 includes one or more devices that produce graphical displays of text, pictures, video, and graphical user interfaces (GUIs) for controlling programs in the computing device 104. In a mobile computing device, the display component 140 typically includes a backlit liquid crystal display (LCD) or an organic light emitting diode (OLED) display component. The majority of power consumption associated with the display component 140 is associated with generating an active emission of light to enable a user to view the display. In an LCD embodiment, a backlight such as an array of light emitting diodes (LEDs) generates the light. In an OLED panel, individual organic LED pixels emit light to form a visible display. The level of power consumption for the display component 140 varies based on the amount of time when the display 140 emits light and the brightness of the display output.

The input component 144 includes touch input components such as capacitive and resistive touch interfaces that are integrated with the display 140, and other input modes including, but not limited to, buttons, dials, switches, keyboards, mice, touch pads, gesture input, and voice input components. The input component 144 enables the user to enter input to control the operation of one or more software programs in the computing device 104.

The data storage component 150 is a non-volatile digital data storage component that stores operating system (OS) data 152, framework and system library data 154, program and user data 156, and power state FSM model data 158. In a typical mobile device, the data storage component 150 is a solid-state memory component such as a solid state drive (SSD) that is employs NAND flash or another memory storage technology that is adapted to use in mobile applications. Personal computer (PC) computing devices typically use one or more solid-state, magnetic disk, or optical disk data storage components.

The user programs and data 156 include a wide range of software programs that are installed by a user for execution by the computing device 104. User data 156 also include data files such as photographs, videos, audio files, word processing documents and spreadsheets, databases, stored email and text messages, and any other data that the user of the computing device views or manipulates using the software programs in the computing device 104. The power state FSM model data 158 include stored power state and power state transition FSM models that are generated using processes that are described more fully below in FIG. 2 and FIG. 3.

The operating system (OS) data 152 includes binary executable code that implements an operating system kernel and hardware driver software that enables the OS to control the operation of the various hardware components in the computing device 104. In the context of mobile computing devices, common embodiments of the OS software 152 include variants of the Windows CE and Windows NT kernels (used in versions of Windows Mobile OS and Windows Phone OS), the Linux kernel (used in the Android OS), and the XNU kernel (used in Apple iOS). As used in this document, the "OS" software 152 refers to kernel-level software that implements the system calls used by higher-layer programs in addition to other services that are separated from user-level software programs through kernel interfaces. In some software configurations, the OS software 152 also provides services for the generation of multiple "virtual machines" (VMs) that further isolate higher-level programs. Other portions of an "operating system" are often referred to more broadly to include framework code 154 such as system libraries, graphical user interface (GUI) toolkits, input interface libraries, and the like. The framework code 154 interfaces with the kernel services provided by the OS code 152, but the processor 108 executes the services and library functions in the framework 154 as part of the user memory space that includes higher-level user programs 156. For example, a web browser executed on a smartphone is a user level program 156 that typically use integrated libraries and services such as HTML and JavaScript engines in the framework program data 154. The framework program data 154 include invocations of system calls to request services from the OS 152. In another embodiment, the user programs 156 can bypass the framework code 154 to invoke system calls with the OS 152 directly.

In the embodiment of FIG. 1, both the OS code 152 and framework code 154 are instrumented to enable precise tracing of the execution of system calls and associated software functions in the computing device 104. As used herein, the term "instrumentation" as applied to the OS and framework code 154 refers to any software instructions that enable monitoring and recording of the execution of system calls including, the identity of a system call, a time at which a system call is invoked, the data parameters that are passed to the system call, any data that are returned from the system call, and a call trace of the software function, thread, and process that invoked the system call, including a log of previous system calls that may have been made in conjunction with the traced system call. Various forms of instrumentation including thunking, operating system level tracing services such as dtrace and SystemTap, debugging utilities like strace, and program profilers can be used to instrument the OS code 152 and framework code 154.

Figure 7:
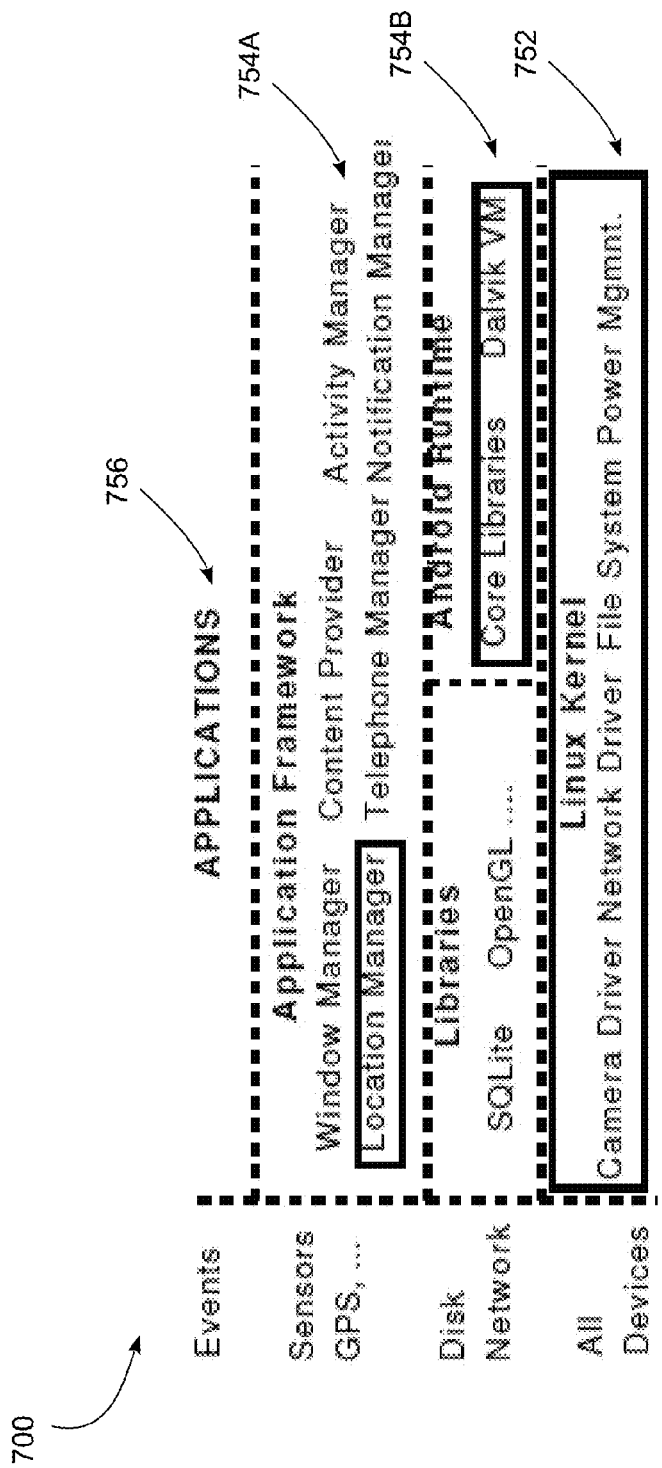
FIG. 7 is a diagram depicting software components and instrumented software components in a computing device for tracing of system call execution in conjunction with power monitoring of the computing device.

FIG. 7 depicts software components 700 in an embodiment of the Android operating system including user applications 756, the Android application framework services 754A, libraries and the Android runtime 754B, and the Linux Kernel OS layer 752. In the example of FIG. 7, the Location Manage service in the Android application framework services 754A, core libraries and the Dalvik virtual machine (VM) 754B, and portions of the Linux Kernel 752 are instrumented to identify system calls that are related to queries for location data from the GPS receiver 128. In the example of the Android system, the Linux Kernel is instrumented to provide low-level information about the system calls that are invoked to access the GPS component, and the higher level Android libraries and VM 754B and Location Manager services 754A are instrumented to enable identification of the precise calling thread, process, and function in the user application 756 that makes the request for GPS data.

In the Android system, the user-level applications rarely invoke system calls directly. Instead, the application invokes calls to frameworks, services, and lower level libraries that mask the complexity of the lower-layer system call interface and enable higher-level programs to interact with a large number of hardware components, such as different GPS receiver models, without requiring specific code for each hardware component model. The instrumentation of the OS and the software framework stack enables precise tracing of system calls and synchronization of system call execution with the monitored power consumption in the computing device 104 that is used to generate FSM models for estimation of power and energy consumption in the computing device 104.

In the computing system 104, the I/O channels 118 communicatively couple the processor 108 to the other components in the computing device to enable the processor 108 to operate the components and send/receive data from the components. For example, the processor 108 typically includes a memory controller that enables the processor 108 to send addressing, read, and write commands to the RAM 124 through electrical traces that are formed in a printed circuit board. The processor 108 uses other standardized I/O channels including, but not limited to, the peripheral component interconnect (PCI), PCI express, I²C, Universal Serial Bus (USB), IEEE 1394 (Firewire), serial AT attachment (SATA), small computer system interface (SCSI), and Ethernet I/O channels to communicate with various components in the computing device 104. In the computing device 104, many system call operations include reading or writing data in the RAM 124 to one or more of the components through the I/O channels 118. As depicted in FIG. 1, the RAM 124 is communicatively connected to the components through the I/O channels 118 using, for example, direct memory access (DMA) or other communication techniques that enable direct communication between the RAM 124 and components in the computing device 124 with little or no interaction with the CPU 112 in the processor 108. Thus, in some system calls the processor 108 performs a minimal amount of processing to arbitrate access between components and the RAM 124 to perform the direct memory access, but the data transfer occurs independently from the operation of the processor 108.

In the configuration of FIG. 1, an external power monitor 170 is operatively connected to the computing device 104. The external power monitor 170 is configured to monitor the electrical power consumption of the computing device 104 during different modes of operation, including monitoring the power consumption before, during, and after execution of system calls with the processor 108 to identify power states in the computing device 104. Power states include a base power state when the computing device 104 is activated but otherwise idle, productive power states when the processor 108 and one or more system components fulfill a request invoked through a system call, and tail power states when one or more components in the computing device 104 consume power at an elevated level from the base state, but do not perform processing in conjunction with a system call. The power consumption data that are generated by the external power monitor 170 are stored in a memory, such as the data storage component 150 or in the memory of an external computing device (not shown). In one embodiment, the external power monitor 170 monitors the supply of electrical power to the computing device and temporarily replaces a battery or other energy storage component that is use to supply power to a mobile computing device and measure the power consumption at a predetermined rate such as once every 200 microseconds. After generation of the power state FSM data 158, the external power monitor 170 is disconnected from the computing device 104 during normal operation of the computing device 104, and the processor 108 optionally estimates the power and energy consumption of the computing device 104 using the power state FSM data 158 without requiring the external power monitor 170. In one embodiment, the external power monitor 170 is a Monsoon PowerMonitor from Monsoon Solutions Inc. of Bellevue, Wash.

As described below, the computing device 104 executes a series of system calls that generate activity through the I/O channels 118 to operate components in the computing device 104. During a power monitoring process, the processor 108 generates time stamps corresponding to the time at which the system calls are executed and are completed. Since many of the components in the computing device continue to consume electrical power at elevated levels in tail power states after the processor 108 returns from the system call, the power meter 170 continues to monitor the power consumption after the return of the system call until the computing device 104 returns to the base power state.

Figure 2:
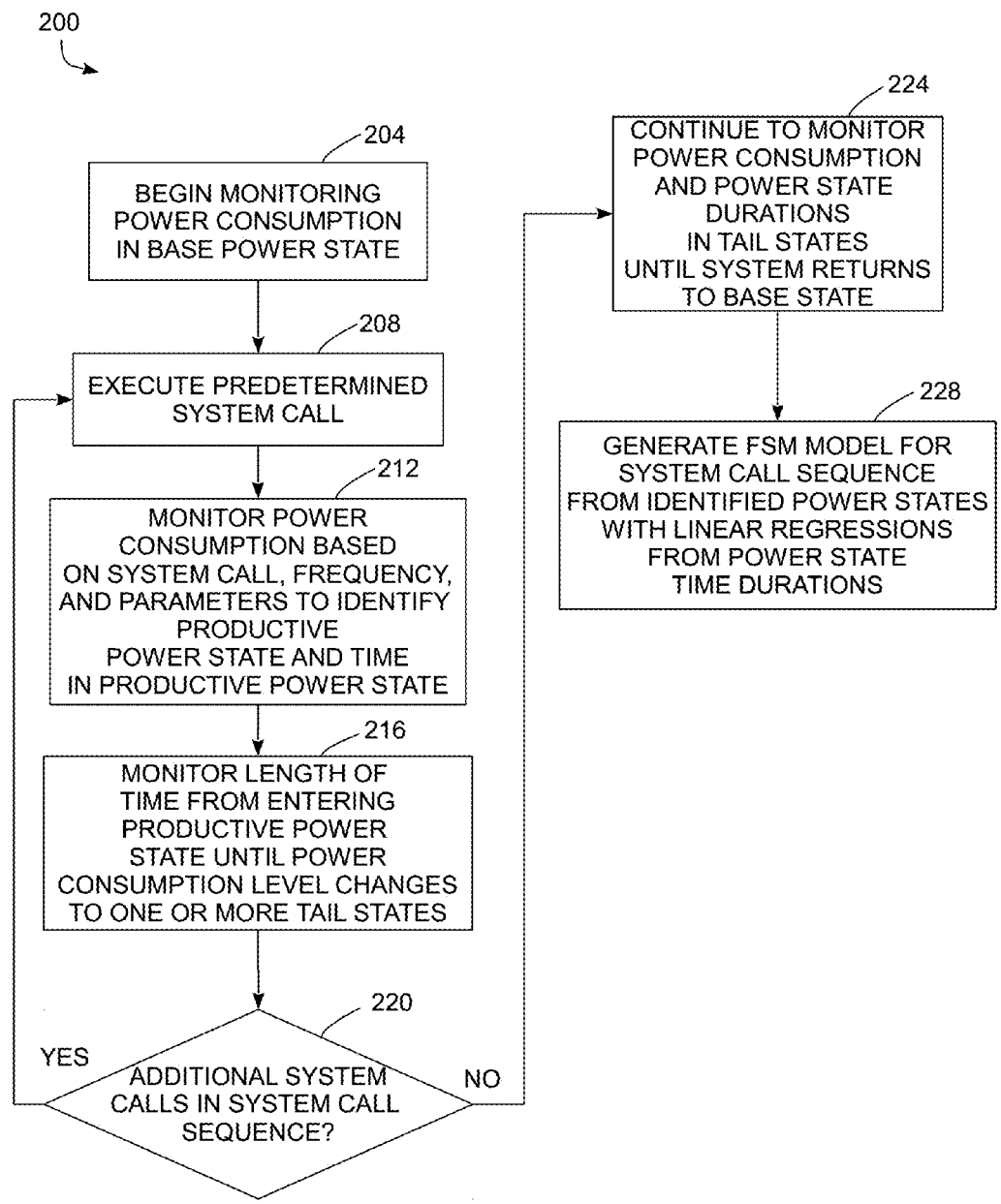
FIG. 2 is a block diagram of a process for generating a power consumption and energy usage model for a mobile computing device through monitoring device power consumption before, during, and after one or more system calls.

FIG. 2 depicts a diagram of a process 200 for generating a power consumption and energy usage model for a computing device. In the discussion below, a reference to the process 200 performing a function or action refers to a processor executing programmed instructions stored in a memory to operate one or more components in a computing device to perform the function or action. Process 200 is described in conjunction with the computing device of FIG. 1 for illustrative purposes.

Process 200 begins when the computing device 104 operates in a predetermined base state and the power meter 170 monitors the total power consumption of the computing device 104 (block 204). In the base state, the CPU 112 in the processor 108 is operated at a fixed power consumption level, and the other components in the computing device are placed in an idle state at a minimum operational power level. In one embodiment, the CPU 112 is operated at a fixed clock frequency with all of the processing cores, caches, and other functional units being activated in the base state. In the computing device 104, the GPU 116 is similarly operated at a fixed power level or is optionally deactivated if the GPU 116 is not required for execution of some or all of the system calls in the computing device 104. The CPU 112 is operated at the fixed power level in the base state and in other power states to minimize any changes in the power consumption due to the operation of the CPU 112. Instead, the changes in power states of the computing device occur due to activation of components in the device 104 in response to system calls, the operation of the components in different power states, and the return of the components to idle operation in the base state. The computing device 104 consumes some electrical power in the base state, but the electrical power consumption is less than during productive power states of the components in the computing device.

Process 200 continues as the computing device 104 executes a predetermined system call, including a set of data parameters that are passed to the system call if applicable (block 208). In the computing device 104, the execution of the system call is monitored with the instrumented OS 152 or software frameworks 154 to identify the time at which the system call begins execution. The time of execution of the system call in the processor computing device 104 is synchronized with timestamps for the output of the power monitor 170 to enable identification of a change in power consumption for the computing device 104 at the time of execution for the system call.

The power monitor 170 monitors a transition in power state and a duration of the power state from the base state to another power state in response to the execution of the system call (block 212). During an identified power state, the power consumption of the computing device remains constant within a predetermined range of variation (e.g. ±10 mW). Thus, the processor 108 identifies the productive power state using, for example, a moving average of electrical current draw readings from the power monitor 170. When the power level deviates from the moving average value of the previous power state for a sufficient time (e.g. 20 ms), then the power monitoring data indicate the transition to a new power state. For example, when the processor 108 execute the system call, the power consumption level changes to a new level that deviates from the power consumption level in the base state for transition to the productive power state.

The power monitor 170 continues to monitor the power consumption of the computing system 104 during process 200 to identify when the computing system 104 transitions to different productive power states, tail power states, and returns to the base power state (block 216). Both the power level and duration of the power states are measured during process 200. The processor 108 or an external computing device identify power states and transitions between power states after the execution of the system calls in process 200 in a manner that does not affect the power consumption of the computing device 104 when executing and monitoring the power states corresponding to the system calls.

In some configurations, the processor 108 in the computing device 104 executes a series of system calls in a predetermined order to execute operations that are performed by software programs during regular operation of the computing device 104 (block 220). For example, to write file data to the data storage component 150 using the Android operating system, the processor 108 executes commands through the software framework 154 and underlying OS 152 to perform the open system call, one or more read and write system calls, and the close system calls. The open system call initiates accesses to a file associated with the user programs and data 156 in the data storage component 150. In some embodiments, the open system call returns quickly, which causes the data storage component 150 to enter a productive power state briefly, followed by tail power state with a higher level of power consumption than the base state. The data storage component 150 remains in the elevated tail power state until a measured time elapses after the productive power state ended and the data storage component 150 returns to the base power state. During one configuration of process 200, the processor 108 executes one or more read and/or write system calls while the computing device 104 is in the tail power state. The power monitor 170 measures the transitions from the tail power state to a productive power state while the write takes place, and then returning to the tail power state.

In another configuration of the process 200, the processor 108 delays the execution of additional read or write system calls until the computing device 104 returns to the base power state. The power monitor 170 measures transitions between the base power state, the productive power state when reading or writing data to the data storage component 150, and any tail power states for each of a series of read or write system calls.

Additionally, the instrumented OS software 152 optionally identifies if the data corresponding to one or more read or write system calls are temporarily buffered in the RAM 124 during the execution of the execution of the system call. If the data is buffered in the RAM 124, the processor 108 performs the system call using the buffered data without interacting with the data storage component 150, and the system call does not generate a transition in power state. The OS 152 includes low-level instrumentation that identifies the state of RAM buffers used for file caches to identify if a particular invocation of a system call generates I/O activity with the storage component 150, or merely accesses the RAM 124. For example, a memory cache typically stores a portion of a file or the entire file using one or more fixed-size blocks of data. The instrumented OS 142 identifies the portion of the file that is affected by the system call and identifies if the data blocks in the file are stored in the RAM 124, and if so label the system call with a data access status flag. The data access status flag indicates that the blocks are cached, then the system call does not result in access to the data storage component 150.

In another configuration of the process 200, the processor 108 executes a series of system calls at different rates to identify different power states for a component in the computing device 104. For example, in one embodiment the wireless network component 132 enters a first power state when executing system calls to transmit data packets at less than a threshold rate, and enters a higher power state if the rate of packet transmission exceeds the threshold rate. Since the threshold rate for packet transmissions that produce transitions to different power states are not known in advance, the system call sequences in one or more instances of the process 200 are executed at different rates to identify the threshold rate for executing system calls that trigger the changes in productive power states. For example, in one embodiment of the process 200, the processor 108 executes system calls to transmit packets with the wireless network component at a rate of less than fifty packets per second. The wireless network component 132 consumes power to transmit the packets, but due to the comparatively low transmission rate, the network component 132 operates at less than a maximum operating power level. The power monitor 170 measures the power state for the computing device during transmission of data packets at the lower transmission rate. In one embodiment, the system calls for transmitting data packets are executed at different rates and optionally with different numbers of data packets passed as parameters to the system calls to transition the operation of the wireless network component 132 to a higher-level power state in which the packets are transmitted in a higher bandwidth mode. In another embodiment, a single system call includes a data parameter that produces either the lower-bandwidth transmission or higher-bandwidth transmission in the same manner as a sequence of individual system calls that are executed at different rates. During process 200, the processor 108 executes system calls to have the wireless network component 132 sends packets at different rates ranging from low-bandwidth to high bandwidth transmission rates. The power monitor 170 monitors the power consumption levels and durations of the productive power states and the power consumption levels and durations of tail power states between the execution of system calls in the system call sequence.

An efficient process for identifying a threshold between the low productive power state and the high productive power state includes performing a binary search using a range of data parameters that are passed to a series of socket write system calls for transmission of packets at different sending rates. As discussed above, different sending rates affect the power state of some components. Some parameter values are selected from a numerical range, and the process 200 is configured to select parameter values using a binary search sequence to efficiently search for the parameter value that corresponds to the threshold sending rate for identifying when the component, such as the wireless network component 132, transitions between different productive power states. The binary search scheme effectively covers the entire range of parameter values that are passed to the system call without having to execute the system call with every potential parameter value.

The binary search process performs repeated invocations of the write system call with different write parameter sizes to identify the ranges of the data parameter values that produce transitions to the lower-power and higher-power productive power states. For example, a binary search process executes the write system call with the maximum data parameter value ($2^{32}$ bytes), and executes a series of write system calls with smaller data parameters that are reduced by a factor of two during each successive system call (e.g. $2^{31}$ bytes, $2^{30}$ bytes, etc). The binary call search process continues until the system executes the socket write system call with $2^{20}$ bytes of data, which results in a transition to the lower-power consumption productive power state. The search process continues with parameter values inbetween $2^{20}$ and $2^{21}$ until the range is sufficiently narrowed down to a single threshold or a small range of thresholds. In the example above, the binary search process identifies the first and second power states and the threshold data parameters that generate transitions to the power states using at most 32 system calls, instead of requiring a system call for every potential data parameter value to the system call.

In addition to identifying if an invocation of a system call generates transitions to different productive power states, the external power monitor 170 measures the duration of the productive power states that are triggered after each set of data parameters to the system call. The duration of the power states for some system calls is substantially constant. For example, in one embodiment the processor 108 triggers a productive power state with a single duration whenever the open system call is invoked. The duration of the productive and tail power states for some system calls vary with reference to the parameters that are passed to the system call. For example, the duration of the productive power state in the data storage component increases in proportion to the number of bytes of data that are passed to the write system call. During process 200, the processor 108 executes system calls with data parameters of varying sizes to identify variations in the duration of the power states that are triggered in response to invocation of the system call with the data parameters. A linear regression model is generated to estimate the duration of the power states using a comparatively small number of invocations of the system call with varying data parameters. For example, in one embodiment the process 200 executes the write system call to write 512 bytes of data, 1024 bytes 9 of data ($2^{10}$), 2048 bytes s of data ($2^{11}$), 4096 bytes of data ($2^{12}$), etc. until reaching the maximum practical data size for the write system call. The power monitor 170 measures the duration of the power states that are triggered by each invocation of the write system call, and the process 200 generates a linear regression model for use in estimating the time duration for the power states that are triggered by the write call over a wide range of write data sizes.

Process 200 continues after completion of one system call or a sequence of system calls (block 220), the external power monitor 170 continues to monitor the power state of the computing device in one or more tail power states until the computing device 104 returns to the base power state (block 224).

Process 200 continues as the measured power states and transitions between power states are used to generate a finite state machine (FSM) model of the energy consumption for the entire computing device 104 in both the productive and tail power states that are recorded in association with one or more of the system calls in process 200 (block 228). The power monitor 170 measures the instantaneous power consumption of the computing device and generates longitudinal power consumption data of the computing device 104 over time during process 200, including transitions between the productive and tail power states and the length of time that the computing device 104 spends in each power state. The measured power states form the individual states in the FSM. In addition to the power consumption level of each power state, the measured length of time for the duration of the power state is stored within the FSM model. As described above, the duration of power states that are triggered by the invocation of some system calls depend upon the values of data parameters that are passed to the system call, and the FSM model includes the linear regression models to estimate the duration of the power states with reference to the data parameters that are passed to the system calls. In one embodiment, the system calls that are executed within a predetermined period of time before entering the power state and maintaining the power state are used to identify transitions between the states in the FSM. Thus, the FSM is identified with reference to both the measured power states of the computing device 104 and the recorded system calls that operate components in the computing device 104 to produce transitions between the power states.

Figure 4:
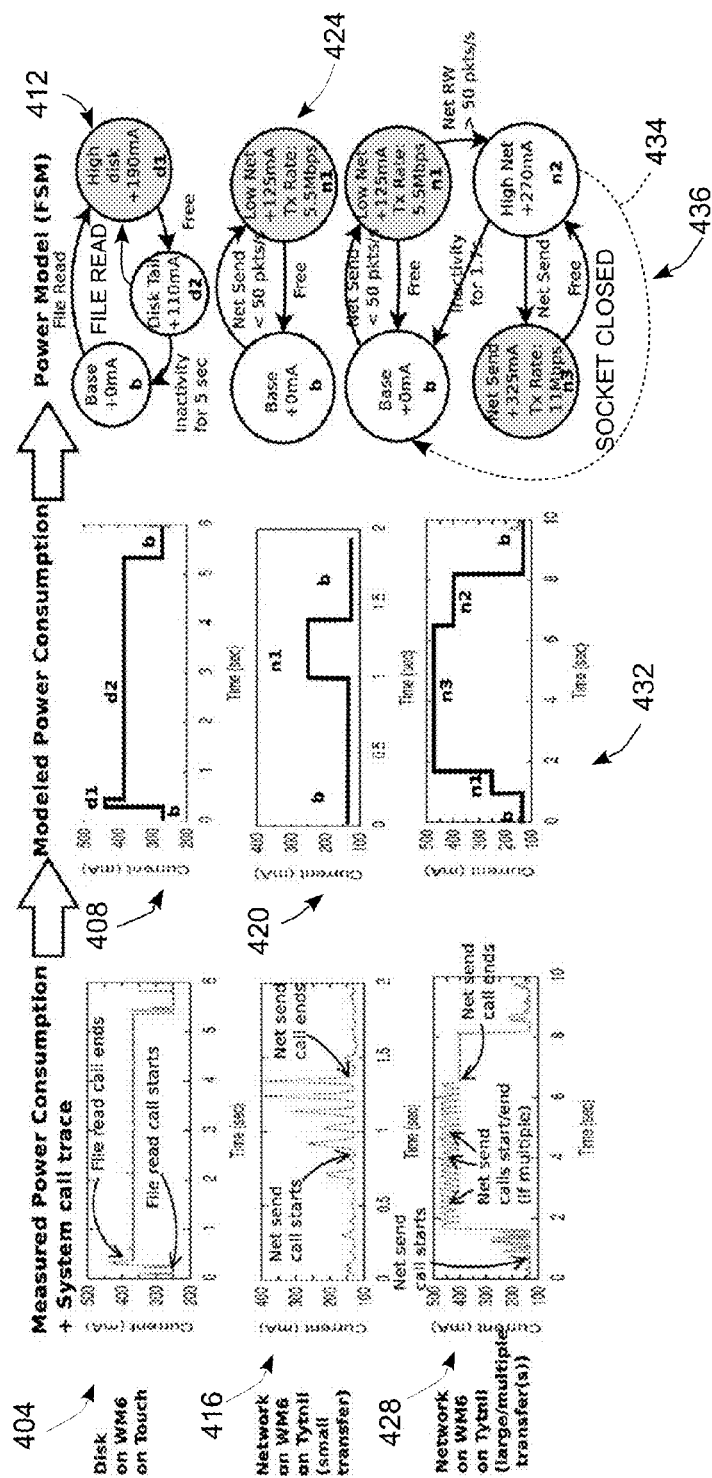
FIG. 4 is a depiction of power consumption graphs, power state graphs, and corresponding finite state machine model graphs corresponding to system calls that are executed in different computing devices.

FIG. 4 depicts three different measured power consumption graphs with corresponding power states and FSMs that are generated for different sets of system calls using two different hardware embodiments that are similar to the computing device 104. The graph 404 depicts measured power consumption of an HTC Touch smartphone using the Windows Mobile 6.1 operating system during and after a file read (read) system call to an onboard data storage component such as a NAND flash memory. The graph 408 depicts a model of the power consumption graph 404 with identified productive power state d1, which occurs during execution of the read system call, tail power state d2, which occurs after the read is complete, and the base power state b, which the phone reverts to after the tail state d2. The FSM graph 412 depicts an FSM model including the power states b, d1, and d2 with the corresponding system calls that trigger transitions between the power states. In the FSM model graph 412, after a five-second period of inactivity elapses, the FSM model transitions from the tail state d2 to the base state b. In the example of the FSM 408, the five-second period of inactivity is measured by the external power monitor 170 in the graph 404 during process 200, and elapsed time varies for different components in different operating modes.

FIG. 4 also depicts similar power graphs for sending packets using a wireless network component using an HTC Tytn 2 smartphone in both a low-rate and high-rate packet transmission modes. The graph 416 depicts measured power during transmission of a small number of packets at a rate of less than fifty packets per second. The corresponding power state graph 420 depicts a power state n1 that occurs when a wireless network transceiver sends the packets in a reduced bandwidth operating mode. The FSM model 424 depicts the transitions between the base state b and the power state n1, where the FSM model 424 does not include a tail power state.

In FIG. 4, the power graph 428, the smartphone sends packets at a rate of greater than fifty packets per second. The power state graph 432 includes the initial power state n1, which transitions to a higher power state n3 as the transmission continues and the wireless transceiver transitions from a low-bandwidth operating mode to high-bandwidth operating mode. The phone remains in the n3 power state during transmission of the data packets, and transitions to a tail power state n2 after transmission is completed while the transceiver remains on standby prior to returning to the base power state b. The FSM model 436 depicts the transitions between the different power states. In FIG. 4, the FSM model 436 includes the states and transitions of the simpler FSM model 424 for low-rate packet transmission, and the additional power states and transitions corresponding to the high-rate packet transmission. While not expressly illustrated in the graphs 428 and 432, the FSM model 436 also includes an immediate transition 434 from the tail power state n2 directly to the base power state b if the processor 108 executes a socket close system call that closes the network socket being used to send the packets through the wireless network component 132. The computing device 104 returns to the base power state b in response to the socket close system call instead of waiting for the identified duration (e.g. 1.7 seconds) of the tail power state n2 to expire. Thus, as illustrated in the FSM model graphs 412 and 436, a tail power state optionally includes a default timeout, but intervening system calls can trigger transitions to productive power states or the base power state before the expiration of the tail power state occurs.

As described above, some system calls that access data files stored in data storage component 150 actually access buffered data in the RAM 124 due to buffering and memory caching techniques implemented in the OS 152. Because an access to file data in the RAM 124 does not access the data storage device, the FSM model for system calls that bypass the data storage device 150 includes a null transition that ignores the power states corresponding to the data storage component when a system call accesses the memory buffer in the RAM 124. The OS 152 includes instrumentation code to trace the execution of the system call and to further identify if the RAM 124 is storing the file data that are accessed as part of the system call, or if the system call is directed to the data storage component 150.

Figure 9:
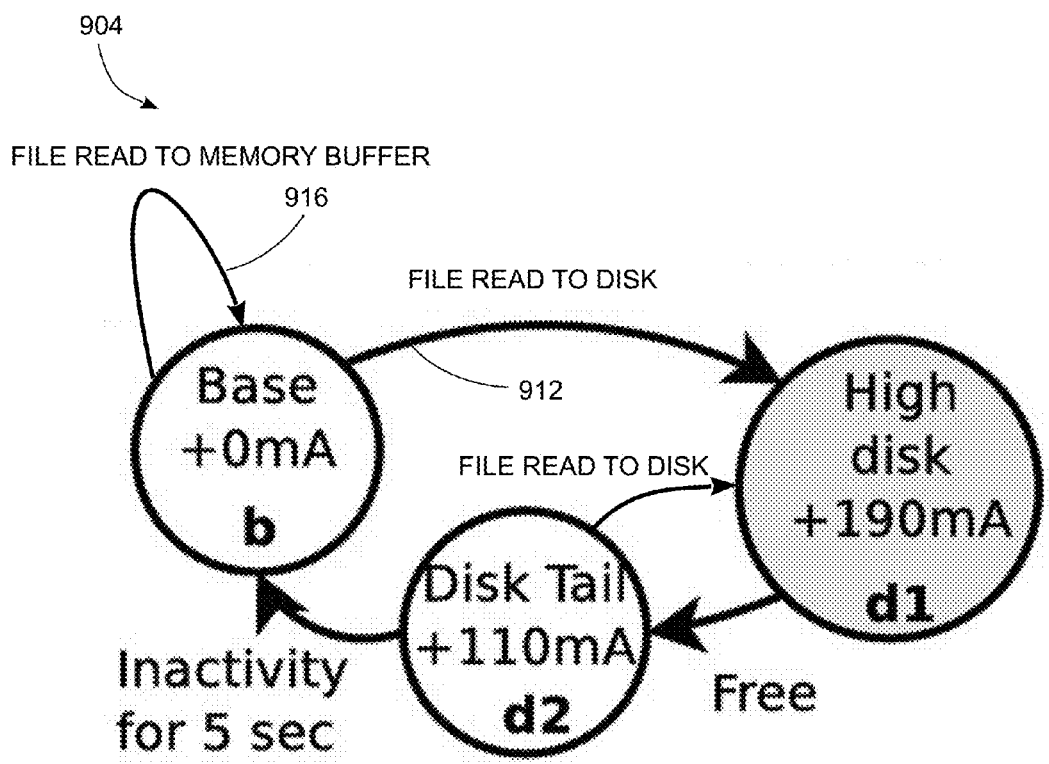
FIG. 9 is a finite state machine model graph for a system call that interacts with a data storage component in a computing device or buffered file data that are cached in a random access memory in the computing device.

FIG. 9 depicts an FSM model graph 904 that includes a base power state b, data storage read productive power state d1, and a data storage tail power state d2. In the FSM model graph 904, a read system call results in either a transition 912 to the storage component read productive power state d1, or a null transition 916 when the read system call accesses buffered data in the RAM 124. During execution of the system call, the instrumented OS generates a system call trace that identifies if the read system call accesses the RAM 124 or the data storage component 150, and the trace is used to drive appropriate transition in the FSM model graph 904 to estimate the energy consumption for different invocations of the read system call.

The processor 108 in the computing device 104 uses the FSM models in the stored power state FSM data 158 to estimate the energy consumption for the storage component read operation during operation when the external power monitor 170 is disconnected from the computing device 104. Each FSM model enables estimation of energy consumption in the computing device 104 through identification of the current power state and the length of time that the computing device 104 spends in the power state. For example, in the FSM model 412 the mobile computing device 104 enters the power state d1 in response to executing the read system call and remains in the power state d1 for the duration of the system call, then transitions to the tail power state d2 before transitioning to the base power state b. The marginal energy consumption of the computing device 104 above the base state b is identified by the increased current consumption during the power state d1, which is 190 mA in the FSM model 412, multiplied by the duration of the system call. As described above the duration of the productive and tail states are identified from the power measurement data generated by the external power monitor 170 during process 200. The duration of some power states is fixed, while the duration of other power states is identified from the linear regression data associated with the observed durations of the productive power states and the values of data parameters that are passed to the system calls to trigger the productive power states. The power state then transitions to the power state d2, which consumes 110 mA of additional current above the base state b and is multiplied by the predetermined length of the tail power state d2 (e.g. 5 seconds) in the absence of additional system calls that affect the data storage component 150. In the FSM model 412, if another read system call occurs during the tail power state d2, then the FSM model 412 includes another transition from the tail power state d2 to the productive power state d1 during the read system call. The processor 108 estimates the marginal energy usage of the read system call as a sum of the milliamp seconds for the power states d1 and d2 multiplied by the supply voltage for the computing device (e.g. 3.7 volts).

While FIG. 1 depicts a configuration where the computing device 104 generates the FSM model data for the power consumption and energy usage model of its own operation, the FSM model data can be used in other computing devices during development of hardware and software for the computing device 104. For example, external computing devices that implement simulators and other design tools also use the FSM data to estimate the power consumption of the computing device 104 in response to executing system calls. Thus, the FSM models generated in process 200 enable accurate estimation of the energy consumption of different software programs in the computing device 104 without the need to execute the software on the computing device 104 directly.

As depicted in the power consumption graphs and power states, and FSM models in FIG. 4, the FSM models include stored data corresponding to the power consumption that occurs during both productive power states and tail power states during operation of the computing device 104. The productive power states include power consumption measurements that occur while the processor 108 executes instructions as part of system calls, which corresponds to the utilization based power measurements of prior art power estimation techniques. Consequently, the process 200 incorporates the power consumption measurements that are identified in prior art utilization models, but further includes tail power states and other power states that affect the energy consumption of the computing device beyond the measurement of power during execution of instructions in the processor 108.

To generate FSMs corresponding to a wide range of operating states in the computing device 104, the process 200 is repeated for different system calls that are compatible with the OS and software frameworks in the computing device 104. In one embodiment, the system call sequences are extracted using system call profiling tools or source code analysis of user level programs 156 on the computing device 104 to ensure that the system calls are germane to the normal operational usage of the computing device 104. The process 200 is also repeated using a single system call or sequence of system calls to cover a range of system call data parameters, and expected frequency of system call sequences to characterize the power states that are reached during different operating modes of the computing device 104. In one embodiment, an automated testing program generates sequences of system calls and process 200 identifies the different power states and transitions between power states that occur during the system call sequences. The automated testing program enables the computing device to transition through one or more tail power states and return to the base power state before executing the next series of system calls. While execution of all potential sequences of system calls and sets of input parameters is infeasible in a real computing system, the automated program executes sequences commonly used system calls to provide reasonable coverage of the power states and power state transitions that occur during operation of most software applications in the computing device. As described above, the data parameters that are passed to some system calls can affect the power consumption level and duration of the productive and tail power states that result from the execution of the system call.

Figure 3:
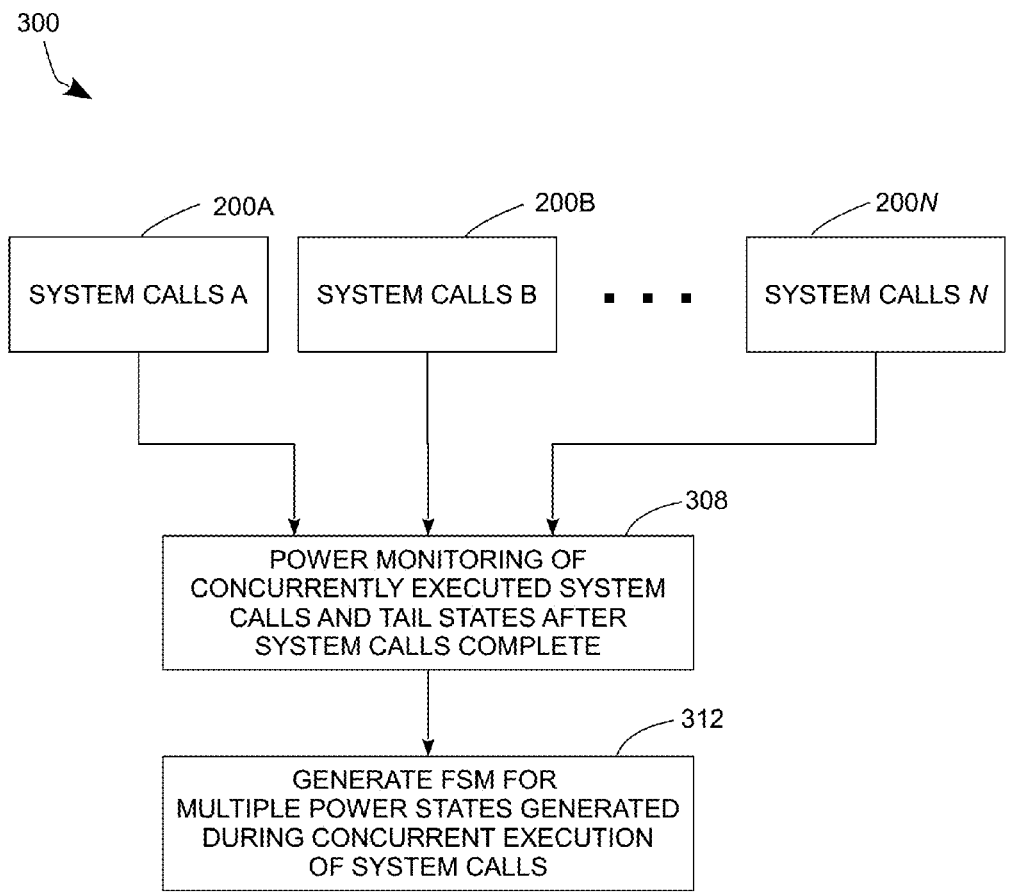
FIG. 3 is a block diagram of a process for generating a power consumption and energy usage model for a mobile computing device through monitoring device power consumption before, during, and after execution of concurrent system calls.

Process 200 describes execution of system calls during which the processor 108 in the computing device 104 interacts with one or more of the components in the computing device through the I/O channels 118. In most modern computing devices, the processor 108 is capable of executing multiple instructions and multiple system calls concurrently using, for example, superscalar execution, very long instruction word (VLIW) execution, symmetric multi-processing (SMP) with multiple independent execution cores, and simultaneous multi-threading (SMT) within a single execution core, or a combination thereof. In different configurations, the computing device 104 executes multiple software processes simultaneously, executes a single software program that includes multiple concurrent execution threads, or a combination of multiple processes and multiple threads. FIG. 3 depicts a block diagram of a process 300 for generating one or more FSMs of the different power states in a mobile computing device during concurrent processing of multiple system calls. In the discussion below, a reference to the process 300 performing a function or action refers to a processor executing programmed instructions stored in a memory to operate one or more components in a computing device to perform the function or action. Process 300 is described in conjunction with the computing device 104 of FIG. 1 and the process 200 of FIG. 2 for illustrative purposes.

Process 300 begins with concurrent execution of at least two instances of the process 200 in the computing device 104 (blocks 200A-200N). While the number of concurrently executed processes and threads can vary based on the hardware and software configuration of the computing device 104, in one embodiment the process 300 executes up to N concurrent instances of the process 200 where N corresponds to a maximum number of independent execution cores or execution threads in the processor 108. During process 300, the external power monitor 170 continues to monitor the execution of the concurrent system calls including system calls that execute simultaneously, and are interleaved to affect the duration of tail power states with different components in the computing device 104 (block 308). The concurrently executed system call processes 200A-200N include a wide range of system calls and system call sequences that are expected to be performed concurrently during regular operation of the computing device 104. For example, in a smartphone system, one expected operating mode occurs when a user executes a media playback program to listen to music or display video concurrently with sending text messages using a wireless data network. One instance of the process 200 executes system calls that are commonly used in the media player, such as reads from the user data 156 in the data storage component 150 and system calls to the audio output component 120, while the other instance of process 200 executes system calls to receive text input from the input components 144 and to send and receive text messages through the wireless network component 132.

The process 300 generates one or more FSMs corresponding to power states that are measured during concurrent execution of multiple software processes or threads that either use different components in the computing device 104, or contend for use of a single component. For example, in one configuration two different software processes execute system calls to access the data storage component 150 and the GPS 128 concurrently. In another configuration, two processes both request access to the data storage component 150 simultaneously, and the OS software 152 manages the concurrent access requests to enable access to the data storage component 150 in a manner that preserves the integrity of the data on the data storage component 150.

Figure 5:
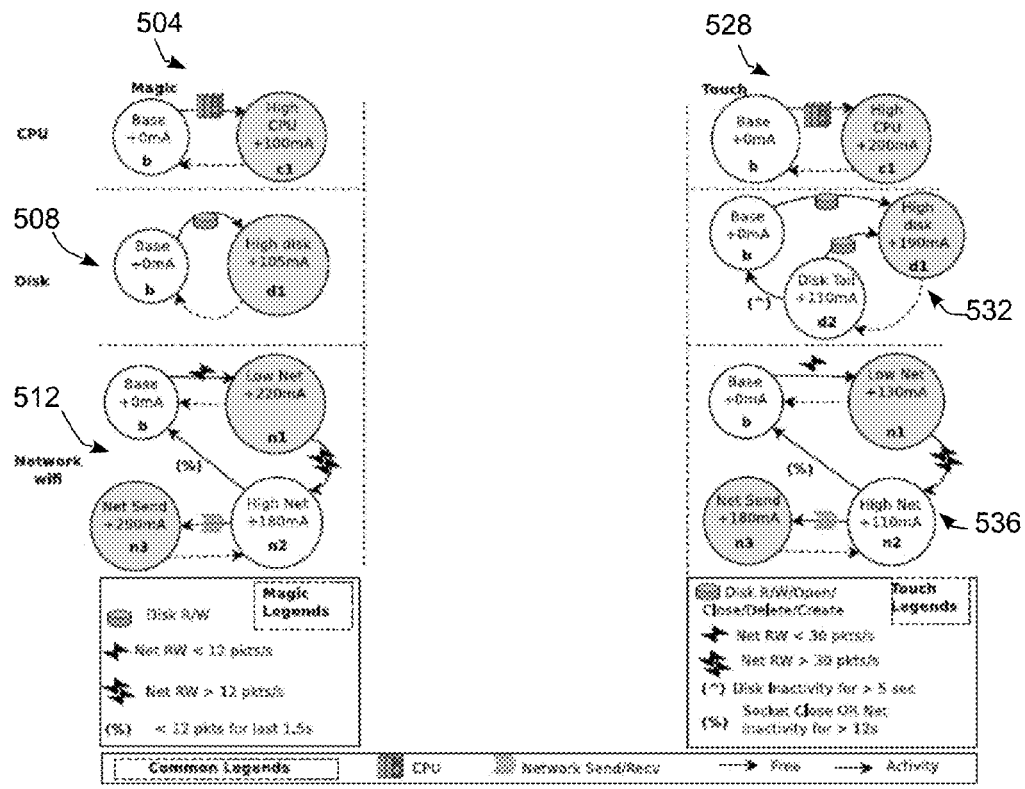
FIG. 5 is a depiction of finite state machine model graphs of power states that are reached through execution of different sets of system calls in two different computing devices.
Figure 6:
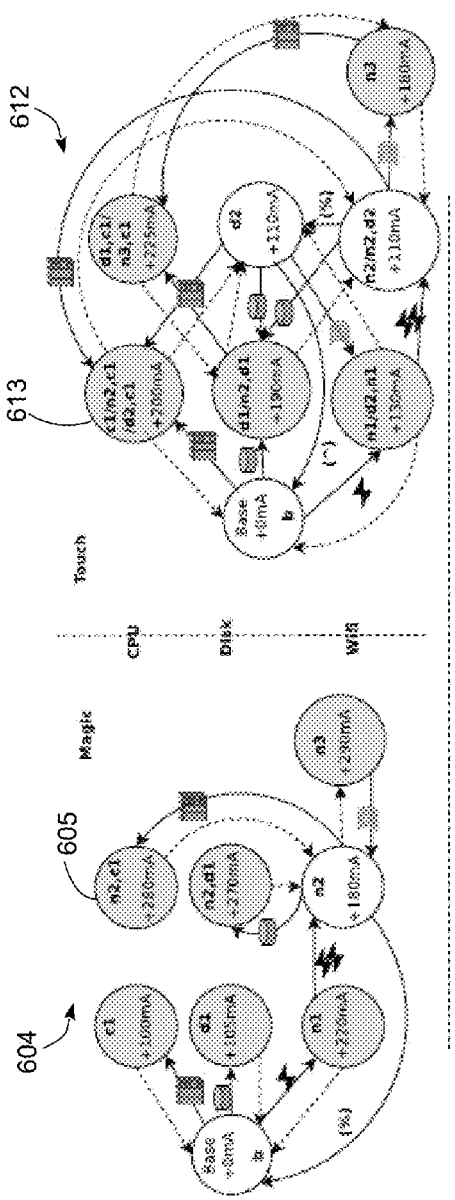
FIG. 6 is a depiction of finite state machine model graphs of power states that are reached during concurrent execution of multiple system calls in two different computing devices.

Process 300 finishes with generation of one or more FSMs that model the energy states and energy state transitions for the computing device 104 during the concurrent execution of multiple system calls and system call sequences (block 312). In one configuration, the total power consumption of the computing device 104 at any one time corresponds to a sum of the individual power states for multiple processes or threads that execute concurrently. For example, in FIG. 5 the FSM model graphs 504, 508, and 512 correspond to power states and transitions that occur during CPU utilization, storage component (disk) utilization, and low or high rate network utilization, respectively, in an HTC Magic smartphone. In FIG. 6, a corresponding FSM model graph 604 depicts an integration of the states and transitions in the same HTC Magic smartphone that includes the FSMs 504-512. In some operating modes, the power state of the FSM model 604 is simply the sum of power states from the corresponding FSMs 504-512. For example, the power state 605 in the FSM model 604 occurs during a period of high CPU usage c1 from the FSM model 504, and network usage tail power state n2 from the FSM model 512. The combined power state 605 is simply the sum of the power consumption in the c1 and n2 power states from the FSMs 504 and 512, respectively.

While the power states in some devices can be identified as a sum of power states from simpler FSM models, other hardware and software embodiments include more complex interactions when multiple components are activated simultaneously. For example, in FIG. 5 the FSM model graphs 528, 532, and 536 correspond to power states and transitions that occur during CPU utilization, storage component (disk) utilization, and low or high rate network utilization, respectively, in an HTC Touch smartphone. In FIG. 6, a corresponding FSM model graph 612 depicts an integration of the states and transitions in the same HTC Touch smartphone that includes the FSMs 528-536. In the FSM model 528, the HTC magic smartphone consumes an additional 200 mA of current when the CPU is in the high power state c1. In the power state 613 of the FSM model graph 612, the CPU is in the high power state c1, and the computing device consumes an additional 200 mA of current over the base state b when the data storage component is in the tail state d2 or the network component is in the tail power state n2. In the individual FSM model graphs, the power states d2 and n2 consume an additional 110 mA each in the FSM model graphs 532 and 536, respectively. Consequently, the combined FSM graph 612 depicts emergent power consumption behavior that is measured in response to the concurrent operation of multiple components in the computing device. The processes 200 and 300 are used to generate FSM models that include different operating modes for both individual and concurrent operation of the components in the computing devices to enable accurate estimation of the energy consumption in a wide range of operating modes.

Figure 8:
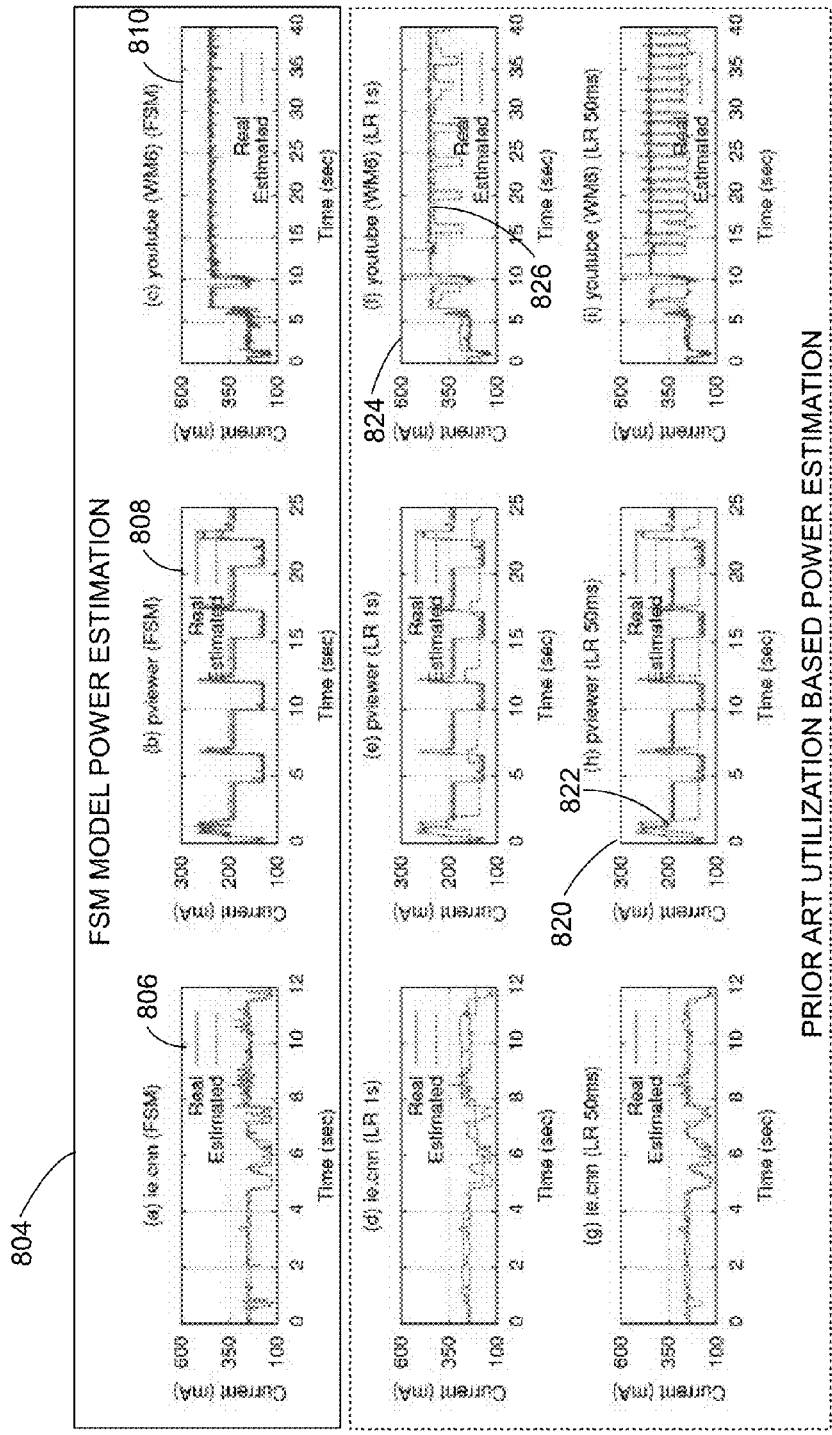
FIG. 8 is a set of diagrams comparing power usage estimation methods using a finite state machine model of power states that include measurements of tail power states to prior art utilization based power estimation techniques.

FIG. 8 depicts graphs 804 of the estimated power consumption and measured power consumption of a mobile phone that executes three programs using the Windows Mobile operating system. The graph 806 depicts the real and estimated power consumption while executing the Internet Explorer web browser, the graph 808 depicts the real and estimated power consumption while executing a picture-viewing program to view photographs, and the graph 810 depicts real and estimated power consumption while executing a YouTube video viewing application. The error between the power consumption estimates that are generated using processes 200 and 300 and the measured power consumption is much smaller than a series of graphs 848 that depict a prior art linear regression (LR) technique that estimates power consumption based solely on system power consumption that is measured while the processor is busy. The prior art estimation methods are typically only accurate for brief periods of time when the processor is busy, such as during the spikes 822 in graph 820 and spikes 826 in graph 824. During periods where the processor 108 is not actively servicing a system call, however, the existing utilization based models tend to become highly inaccurate and often underestimate the actual power consumption of different components in the computing device 104 because the prior art models only account for power consumption during periods of high utilization of the processor 108. Consequently, the power state FSM models generated in processes 200 and 300 above enable estimation of the power consumption of the processor 108 and other components in computing devices such as the computing device 104 with greater precision than can be achieved with existing techniques.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for generating a power consumption and energy usage model in a computing device comprising:
   monitoring power consumption of a computing device of a first power state with an external electrical power monitor;
   executing program instructions stored in a memory corresponding to a first system call with a processor in the computing device, the processor operating a component in the computing device in response to execution of the first system call;
   monitoring the power consumption of a second power state in response to executing the first system call to identify a level of power consumption and a duration of the second power state, the level of power consumption of the second power state being different than a level of power consumption of the first power state;
   monitoring the power consumption of a third power state after a transition from the second power state to identify a level of power consumption and a duration of the third power state, the level of power consumption of the third power state being different than the level of power consumption of each of the first power state and the second power state;
   generating a finite state machine (FSM) model including the first power state, the second power state, and the third power state, the FSM model including a transition from the first power state to the second power state being made with reference to the execution of the first system call, a transition from the second power state to the third power state being made in response to expiration of the duration of the second power state, and a transition from the third power state to the first power state being made in response to expiration of the duration of the third power state; and
   storing the FSM model in the memory for estimation of energy usage of the computing device in response to execution of the first system call by the processor in conjunction with the at least one other component when the computing device is disconnected from the external power monitor.

2. The method of claim 1, the generation of the FSM model further comprising:
   generating a state transition between the third power state and the second power state in the FSM model in response to another execution of the first system call by the processor during the third power state.

3. The method of claim 1, the generation of the FSM model further comprising:
   generating a state transition between the third power state and the first power state in the FSM model in response to executing program instructions stored in the memory corresponding to a second system call with the processor in the computing device during the third power state.

4. The method of claim 1 further comprising:
   executing program instructions stored in the memory corresponding to a second system call with the processor in the computing device, the second system call being executed after the execution of the first system call and the processor operating the computing device in response to execution of the second system call;
   monitoring the power consumption in a fourth power state in response to executing the second system call to identify a level of power consumption and a duration of the fourth power state, the level of power consumption of the fourth power state being different than a level of power consumption of the first, second, and third power states;
   monitoring the power consumption of a fifth power state after a transition from the fourth power state to identify a level of power consumption and a duration of the fifth power state, the level of power consumption of the fifth power state being different than the level of power consumption of each of the first, second, third and fourth power states;
   generating the FSM model including the fourth power state and the fifth power state, the FSM model including a transition from the third power state to the fourth power state in response to the execution of the second system call, a transition from the fourth power state to the fifth power state in response to expiration of the duration of the fourth power state, and a transition from the fifth power state to the first power state being made in response to expiration of the duration of the fifth power state.

5. The method of claim 1 further comprising:
   repeating execution of the program instructions stored in the memory corresponding to the first system call to execute the first system call at a first rate;
   monitoring the power consumption of the second power state and the third power state during the repeated execution of the first system call;
   repeating execution of the program instructions stored in the memory corresponding to the first system call to execute the first system call at a second rate, the second rate being greater than the first rate;

monitoring the power consumption of a fourth power state in response to executing the first system call at the second rate to identify a level of power consumption and a duration of the fourth power state, the level of power consumption of the fourth power state being higher than a level of power consumption of the first, second, and third power states;

monitoring the power consumption of a fifth power state after a transition from the fourth power state to identify a level of power consumption and a duration of the fifth power state, the level of power consumption of the fifth power state being less than the level of power consumption of the fourth power state; and generating the FSM model including the fourth power state and the fifth power state, the FSM model including a transition from the third power state to the fourth power state in response to execution of the second system call at the second rate and a transition from the fourth power state to the fifth power state in response to expiration of the duration of the fourth power state.

6. The method of claim 1 further comprising:

executing the program instructions stored in the memory corresponding to the first system call with the processor with a data parameter being passed in the first system call, the data parameter having a first value;

monitoring the power consumption of the second power state in response to executing the first system call with the data parameter having the first data value to identify a first duration of the second power state;

executing the program instructions stored in the memory corresponding to the first system call with the processor with the data parameter having a second value being passed in the first system call, the second value being different than the first value;

monitoring the power consumption of the second power state in response to executing the first system call with the data parameter having the second data value to identify a second duration of the second power state, the second duration being different than the first duration;

generating a linear regression for the duration of the second power state with reference to the first value of the data parameter in association the first duration and the second value of the data parameter in association with the second duration; and generating the FSM model including the linear regression being used to identify an expiration of the duration of the second power state with reference another value of the data parameter during a subsequent execution of the first system call.

7. The method of claim 1, the component further comprising a wireless network component in the computing device.

8. The method of claim 1, the component further comprising a global positioning system (GPS) receiver in the computing device.

9. The method of claim 1, the component further comprising a data storage component in the computing device.

10. The method of claim 9 further comprising:

generating the FSM model with a null transition from the base power state returning to a base power state instead of to the second power state, the null transition corresponding to the first system call in association with a data access status flag, the data access status flag indicating that data blocks being accessed by the first system call are temporarily stored in a random access memory (RAM) in the computing device to enable execution of the first system call without operating the data storage component.

11. A method for generating a power consumption and energy usage model in a computing device comprising:

monitoring power consumption of a computing device in a first power state with an external electrical power monitor connected to the computing device;

executing program instructions stored in a memory corresponding to a first system call with a processor in the computing device, the processor operating a first component in the computing device in response to execution of the first system call;

executing program instructions stored in the memory corresponding to a second system call with the processor in the computing device concurrently to the execution of the first system call, the processor operating a second component in the computing device in response to execution of the second system call;

monitoring the power consumption in a second power state in response to executing the first system call and the second system call concurrently to identify a level of power consumption and a duration of the second power state, the level of power consumption in the second power state being different than a level of power consumption in the first power state;

monitoring the power consumption in a third power state in response to a transition from the second power state occurring after the second power state to identify a level of power consumption and duration of the third power state, the level of power consumption in the third power state being different than the level of power consumption in each of the first power state and the second power state;

generating a finite state machine (FSM) model including the first power state, the second power state, and the third power state, the FSM model including a transition from the first power state to the second power state being made with reference to the concurrent execution of the first system call and the second system call, a transition from the second power state to the third power state being made with reference to expiration of the duration of the second power state, and a transition from the third power state to the first power state being made with reference to expiration of the duration of the third power state; and storing the FSM model in the memory for estimation of energy usage of the computing device in response to concurrent execution of the first system call by the processor in conjunction with the first component and the second component when the computing device is disconnected from the external power monitor.

12. The method of claim 11 further comprising:

monitoring the power consumption in a fourth power state in response to a reduction in power consumption by the first component after execution of the first system call and prior to another reduction in power consumption by the second component after execution of the second system call; and generating the FSM model including the fourth power state, the FSM model including a transition from the second power state to the fourth power state being made with reference to the reduction in the power consumption of the first component.

13. The method of claim 11, the first component further comprising a wireless network component in the computing device and the second component further comprising a data storage component in the computing device.

14. A computing device comprising:
a memory configured to store program data;

a processor operatively connected to the memory;
a component connected to the processor to enable the processor to communicate with the component; and
the processor being configured to:
receive data from an external power monitor corresponding to power consumption of the computing device in a first power state;
execute program instructions stored in the memory corresponding to a first system call, the processor operating a component in response to execution of the first system call;
receive data from the external power monitor corresponding to power consumption of the computing device in a second power state in response to execution of the first system call to identify a level of power consumption and a duration of the second power state, the level of power consumption in the second power state being different than a level of power consumption in the first power state;
receive data from the external power monitor corresponding to power consumption of the computing device in a third power state after a transition from the second power state to identify a level of power consumption and a duration of the third power state, the level of power consumption in the third power state being different than the level of power consumption in each of the first power state and the second power state;
generate a finite state machine (FSM) model including the first power state, the second power state, and the third power state, the FSM model including a transition from the first power state to the second power state being made with reference to the execution of the first system call, a transition from the second power state to the third power state being made in response to expiration of the duration of the second power state, and a transition from the third power state to the first power state being made in response to expiration of the duration of the third power state; and
store the FSM model in the memory for estimation of energy usage of the computing device in response to execution of the first system call by the processor in conjunction with the at least one other component.

15. The device of claim 14, the processor being further configured to:
generate a state transition between the third power state and the second power state in the FSM model in response to another execution of the first system call by the processor during the third power state.

16. The device of claim 14, the processor being further configured to:
generate a state transition between the third power state and the first power state in the FSM model in response to executing program instructions stored in the memory corresponding to a second system call with the processor in the computing device during the third power state.

17. The device of claim 14, the processor being further configured to:
repeat execution of the program instructions stored in the memory corresponding to the first system call to execute the first system call at a first rate;
receive additional data from the external monitor of the power consumption in the second power state and the third power state during the repeated execution of the first system call;
repeat execution of the program instructions stored in the memory corresponding to the first system call to execute the first system call at a second rate, the second rate being greater than the first rate;
receive additional data from the external power monitor of the power consumption of a fourth power state in response to executing the first system call at the second rate to identify a level of power consumption and a duration of the fourth power state, the level of power consumption of the fourth power state being higher than a level of power consumption of the first, second, and third power states;
receive additional data from the external power monitor of the power consumption of a fifth power state after a transition from the fourth power state to identify a level of power consumption and a duration of the fifth power state, the level of power consumption of the fifth power state being less than the level of power consumption of the fourth power state; and
generate the FSM model including the fourth power state and the fifth power state, the FSM model including a transition from the third power state to the fourth power state in response to execution of the second system call at the second rate and a transition from the fourth power state to the fifth power state in response to expiration of the duration of the fourth power state.

18. The device of claim 14, the processor being further configured to:
execute the program instructions stored in the memory corresponding to the first system call with the processor with a data parameter being passed in the first system call, the data parameter having a first value;
receive additional data from the external power monitor of the power consumption of the second power state in response to executing the first system call with the data parameter having the first data value to identify a first duration of the second power state;
execute the program instructions stored in the memory corresponding to the first system call with the processor with the data parameter having a second value being passed in the first system call, the second value being different than the first value;
receive additional data from the external power monitor of the power consumption of the second power state in response to executing the first system call with the data parameter having the second data value to identify a second duration of the second power state, the second duration being different than the first duration;
generate a linear regression for the duration of the second power state with reference to the first value of the data parameter in association the first duration and the second value of the data parameter in association with the second duration; and
generate the FSM model including the linear regression being used to identify the expiration of the duration of the second power state with reference another value of the data parameter during a subsequent execution of the first system call.

19. The device of claim 14, the processor being further configured to:
execute program instructions stored in the memory corresponding to a second system call concurrently to the execution of the first system call, the processor operating another component in the computing device in response to execution of the second system call;
receive additional data from the external power monitor of the power consumption of a fourth power state in response to executing the first system call and the second system call concurrently to identify a level of power consumption and a duration of the fourth power state, the level of power consumption of the fourth power state being different than the level of power consumption in each of the first power state, the second power state, and the third power state;

receive additional data from the external power monitor of the power consumption of a fifth power state in response to a transition from the fourth power state occurring after completion of the fourth power state to identify a level of power consumption and duration of the fifth power state, the level of power consumption of the fifth power state being different than the level of power consumption in each of the first power state, second power state, third power state, and fourth power state;

generating the (FSM) model including the fourth power state, and the fifth power state, the FSM model including a transition from the first power state to the fourth power state being made with reference to the concurrent execution of the first system call and the second system call, a transition from the fourth power state to the fifth power state being made with reference to expiration of the duration of the fourth power state, and a transition from the fifth power state to the first power state being made with reference to expiration of the duration of the fifth power state; and storing the FSM model in the memory for estimation of energy usage of the computing device in response to concurrent execution of the first system call by the processor in conjunction with the first component and the second component when the computing device is disconnected from the external power monitor.

20. The device of claim 14, the component in the computing device further comprising a wireless network component.

21. The device of claim 14, the component in the computing device further comprising a data storage component.

* * * * *